(12) United States Patent
Taguchi et al.

(10) Patent No.: US 8,294,071 B2
(45) Date of Patent: Oct. 23, 2012

(54) MICROWAVE IRRADIATION APPARATUS

(75) Inventors: Masami Taguchi, Hitachi (JP); Noboru Baba, Hitachiota (JP); Tomokatsu Oguro, Mobara (JP); Toshio Ogura, Mobara (JP); Masumi Kuga, Mutsuzawa (JP)

(73) Assignee: Hitachi, Ltd., Tokyo (JP)

( * ) Notice: Subject to any disclaimer, the term of this patent is extended or adjusted under 35 U.S.C. 154(b) by 940 days.

(21) Appl. No.: 12/109,505

(22) Filed: Apr. 25, 2008

(65) Prior Publication Data
US 2008/0272114 A1 Nov. 6, 2008

(30) Foreign Application Priority Data

Apr. 25, 2007 (JP) ................. 2007-116141

(51) Int. Cl.
*H05B 6/70* (2006.01)
(52) U.S. Cl. ........ 219/690; 219/745; 219/750; 219/697; 204/157.15
(58) Field of Classification Search ................. 219/690, 219/679, 695, 750, 745; 204/298.06, 298.26, 204/157.15
See application file for complete search history.

(56) References Cited

U.S. PATENT DOCUMENTS 6,027,621 A * 2/2000 Akita et al. ............. 204/298.06
2002/0046474 A1* 4/2002 Novak et al. .................... 34/259

FOREIGN PATENT DOCUMENTS

| JP | 03011685 A | * | 1/1991 |
| JP | 2002-504668 | | 2/2002 |
| JP | 2005-44519 | | 2/2005 |
| WO | WO 99/42778 | | 8/1999 |

* cited by examiner

*Primary Examiner* — Henry Yuen
*Assistant Examiner* — Jianying Atkisson
(74) *Attorney, Agent, or Firm* — Antonelli, Terry, Stout & Kraus, LLP.

(57) ABSTRACT

In a microwave irradiation apparatus, an applicator portion has an interior space for housing an object to be irradiated. A first microwave irradiation system outputs a first microwave to the interior space in a first mode so as to generate a large electric field and a small magnetic field at a specific place of the interior space. A second microwave irradiation system outputs a second microwave having a polarization plane crossing a polarization plane of the first microwave to the interior space in a second mode so as to generate a large magnetic field and small electric field at the specific place of the interior space.

5 Claims, 14 Drawing Sheets

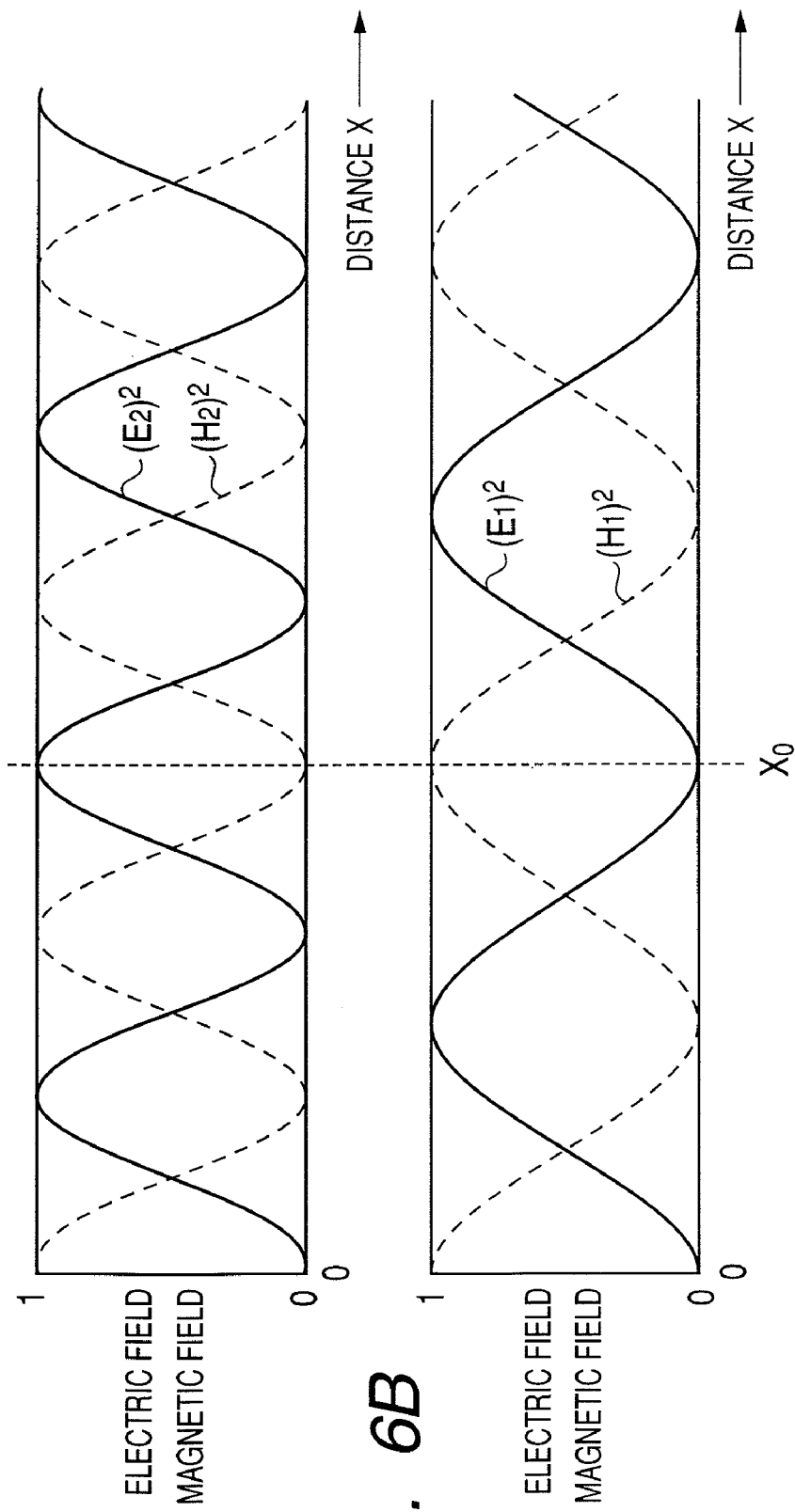

MICROWAVE IRRADIATION APPARATUS

CLAIM OF PRIORITY

This application claims priority from Japanese application serial No. 2007-116141, filed on Apr. 25, 2007, the content of which is hereby incorporated by reference into this application.

BACKGROUND OF THE INVENTION

The present invention relates to a microwave irradiation apparatus for irradiating microwave to an object.

A hot air type heating furnace and hot wire type heating furnace which have been used conventionally do not have satisfactory heat conduction to an object to be heated, and the heat being arrived at an outer surface of the object requires a lot of time to conduct to the inside. Accordingly, the furnaces are generally impossible to perform high energy efficiency.

Then, microwave electric power application has been studied and now the object to be irradiated can be heated quickly and efficiently by transferring the energy of the microwave directly to the object. A microwave oven is one of the typical examples of the microwave electric power application, and it is widely used for foods heating, cooking, and defrosting and the like.

Heating various foods, woods, or the like by the microwave has been known in the industrial field. In recent years, application of the microwave electric power is spreading in the plasma field, such as applying to plasma generation, etching and ashing by the microwave in a semiconductor fabrication equipment, irradiating the microwave to a gas in a quartz valve to excite a gas molecule to produce powerful UV luminescence, and applying to an ultraviolet curing type paint, adhesion materials, and printing (plate making), and so on.

Furthermore, many effects promoting a chemical reaction remarkably by the microwave irradiation are reported in the chemistry industrial field, and the microwave electric power application is also spreading to the chemistry field.

Generally, when microwave is irradiated to the object, the energy loss P due to the object is classified into a item showing a part of the energy loss resulting from the electric field E of the microwave and other item showing a part of the energy loss resulting from the magnetic field H of the microwave, and may be expressed with the following formula (I).

$$P=(1/2)s|E|^2+pfe_0 e_r''|E|^2+pf\mu_0\mu_r''|H|^2 \quad (1)$$

The microwave electric power application mentioned above such as the microwave oven or the like mainly tends to heat the object to be irradiated using loss by the electric field of the microwave. Moreover, the microwave electric power application relating to the above mentioned plasma generation uses the excitation phenomenon by the electric field of the microwave. Thus, the microwave irradiation system mainly uses the electric field of the microwave conventionally, for example, Japanese laid open patent publication No. 2005-44519.

Moreover, a standing wave is formed in an antenna cavity and a paper titled to "a microwave sintering equipment of a nuclear fuel" is well-known, in which the standing wave is taken out through a slit to a resonator cavity enclosing nuclear fuels, for example, as shown in a Japanese laid open patent publication No. 2002-504668.

According to the electromagnetic mode of the irradiated microwave, the microwave irradiation systems will be classified roughly into a single mode and a multi-mode. Typically, the single mode system puts an object to be irradiated within a microwave guide, and realizes by making the microwave propagate within the microwave guide.

Usually, it is so designed that only a specific electromagnetic field mode inside of the microwave guide may be propagated, the system may use selectively the strong part of the electric field and magnetic field according to the distribution in the electromagnetic field mode.

On the other hand, the multi-mode system is represented by the microwave oven such as a microwave heat furnace disclosed in the Japanese laid open patent publication No. 2005-44519 and generates many electromagnetic modes inside of the heating case where the object to be irradiated is placed. The system, however, intermingles both of the electric field and magnetic field changeable in time delicately and accordingly, and even if trying to perform mainly the irradiation of the electric field (or magnetic field) to the object, an unnecessary magnetic field or electric field is always irradiated. As a result, it is substantially impossible to control the electric field and magnetic field independently.

Moreover the equipment disclosed in the Japanese laid open patent publication No. 2002-504668 forms distribution of the electromagnetic field intensity in a resonator cavity by a slit. However, it is also substantially impossible to control the electric field and magnetic field independently.

SUMMARY OF THE INVENTION

However, in the microwave electric power application to the chemical reaction field in recent years, not only an electric field but also the microwave irradiation effect by the magnetic field is considered rather important, and the irradiation system mainly using the magnetic field of the microwave has been desired.

Therefore, although it is considered that the single mode system is more suitable for solving the purpose of the present invention, the following problems arise in the case.

1. Although it is possible to adjust the rate of an intensity ratio of an electric field or a magnetic field by selecting the place in microwave guide, if the place is fixed, the ratio may not be variable.

2. The magnetic field or electric field may be adjusted by controlling a microwave irradiation output. On the other hand, they also change with the same ratio as the electromagnetic field, resulting in inconvenience. For example, under keeping the electric field constant only the magnetic field is not capable of being changed.

3. While maintaining the electric field (or magnetic field) constant in irradiating the microwave, in order to change the magnetic field (or electric field) it is necessary for changing the position of the object to be irradiated in the microwave guide and also adjusting its microwave irradiation output. It is not impossible to change the magnetic field (or electric field) keeping the electric field (or magnetic field) constant but, quick adjustment cannot be performed due to necessary mechanical operation, and as a result, the accuracy of the adjustment worsens.

To solve the problem, the present invention provides a microwave irradiation apparatus capable of irradiating the microwave simultaneously while controlling respectively and independently the electric field and magnetic field of the microwave.

To solve the above mentioned problems, the microwave irradiation apparatus of the present invention comprises an applicator portion having an interior space for housing an object to be irradiated, a first microwave irradiation system for outputting a first microwave to the interior space in a first mode so as to generate a large electric field and a small magnetic field at a specific place of the interior space, and a second microwave irradiation system for outputting a second microwave having a polarization plane crossing a polarization plane of the first microwave to the interior space in a second mode so as to generate a large magnetic field and small electric field at the specific place of the interior space.

The detailed technical concept will be explained through the following description.

According to the microwave irradiation apparatus in accordance with the present invention, it is possible to irradiate the first microwave and second microwave simultaneously to the object (or space portion where the object is placed to be irradiated) while controlling independently the magnetic field and electric field of them.

BRIEF DESCRIPTION OF THE DRAWINGS

FIGS. 6A and 6B are graphs showing a relationship between a distance X from a short circuit surface and a square value of an electromagnetic field intensity generated by the microwave inside the applicator portion. In addition, the square value of the electromagnetic field intensity is normalized as illustrated;

DETAILED DESCRIPTION OF THE PREFERRED EMBODIMENTS

Hereinafter, an embodiment for carrying out this invention is explained in detail with reference to the attached drawings.

First Embodiment

Figure 1:
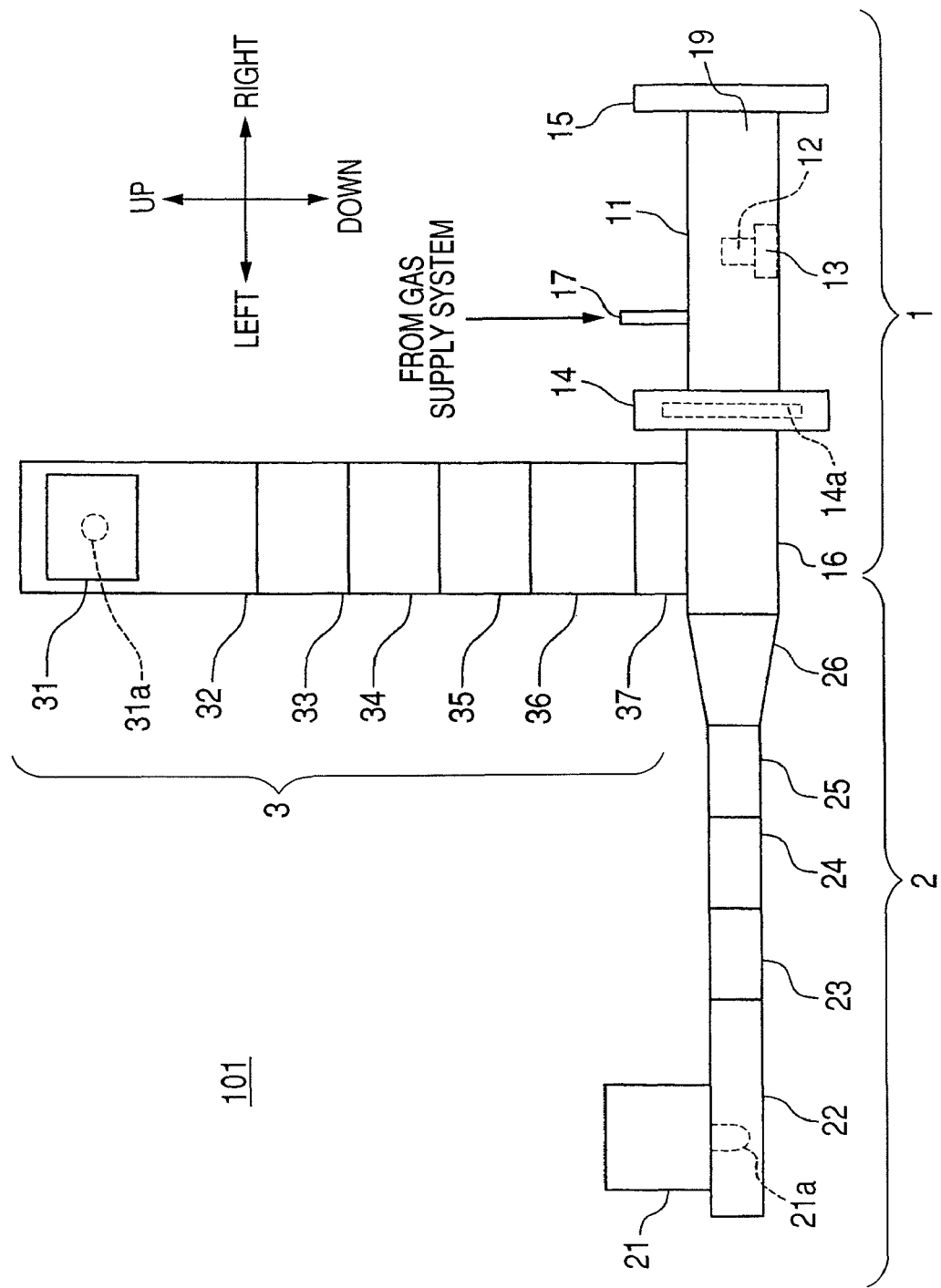
FIG. 1 is an elevation view showing a microwave irradiation apparatus of a first embodiment in accordance with the present invention.

FIG. 1 is an elevation view showing a microwave irradiation apparatus 101 of a first embodiment in accordance with the invention. The microwave irradiation apparatus 101 comprises an applicator portion 1, a first microwave generating portion 2 to be a first microwave irradiation system, and a second microwave generating portion 3 to be a second microwave irradiation system. The first microwave generating portion 2 and a second microwave generating portion 3 are connected to the applicator portion 1. At least a portion forming a transfer path or reflective surface for the microwave among each element of the microwave irradiation apparatus 101 are made of high conductivity material, such as metal.

The applicator portion 1 has a rectangular tube portion 11, a microwave short circuit portion 15, a partition window portion 14, a connecting portion 16, and a gas supply portion 17. The rectangular tube portion 11 has a hollow and its cross section crossing the wave guide axis direction (in the case of the applicator portion 1, a horizontal direction in FIG. 1; the traveling direction of the entered microwave energy) at right angles is rectangular.

One end (in FIG. 1, a rightward end) of the rectangular tube portion 11 is sealed by the microwave short circuit portion 15 and the other end (in FIG. 1, a leftward end) of the rectangular tube portion 11 is sealed by the partition window portion 14 and a connecting portion 16 which has a rectangular tubular cross sectional form in the inside is attached through the partition window portion 14.

The base 13 made of an insulator is arranged in an interior space 19 formed by sealing the rectangular tube portion 11 by the partition window portion 14 and microwave short circuit portion 15, and the base 13 holds the object 12 to be irradiated.

The interior space 19 of the rectangular tube portion 11 formed in this way is in airtight, and the gas supply portion 17 having one end connected to the interior space 19 and the other end connected to the gas feed system (not shown) is further provided with the rectangular tube portion 11.

For this reason, by controlling the gas feed system (not shown), an inactive gas such as argon and nitrogen, can be supplied to the interior space 19 of the rectangular tube portion 11 through the gas supply portion 17, or the interior space 19 may be pressurized or decompressed to maintain a desired atmosphere.

The partition window portion 14 has a partition window 14a composed of materials with a property easy to allow the microwave to pass through, for example, high purity alumina ceramics and fused quartz and the like. Therefore, most of all the microwave which travels to the rectangular tube portion 11 goes from the connecting portion 16 to the interior space 19 of the rectangular tube portion 11 through the partition window 14a of the partition window portion 14.

The microwave short circuit portions 15 are made of high conductivity material such as metal. The microwave entered into the interior space 19 of the rectangular tube portion 11 through the partition window portion 14 partially irradiates an object 12 and many of the residues of the microwave reaches to the microwave short circuit portion 15. The microwave short circuit portion 15 allows the incident microwave to reflect at high rate.

Incidentally, a microwave toward the microwave short circuit portion 15 from the partition window portion 14 is called as a traveling wave, and on the contrary a microwave reflected at the microwave short circuit portion 15 and going back to the partition window portion 14 is called as a reflective wave.

The first microwave generating portion 2 comprises a microwave guide mounting portion 22 having a magnetron 21, an isolator portion 23, a power monitoring portion 24, a tuner portion 25 and a tapered microwave guide portion 26. All of these are connected so as to align like a series of wave guide toward the right from the left, that is, the microwave traveling direction as shown in FIG. 1.

The magnetron 21 oscillates the microwave of a 2450 MHz belt, for example, and radiates it from an output portion 21a.

The microwave guide mounting portion 22 supports the magnetron 21 mechanically and takes out efficiently the microwave outputted from the output portion 21a of the magnetron 21. Specifically, the terminal end of the microwave guide mounting portion 22, namely, a tip part of the first microwave generating portion 2 is short-circuited at the distance of ¼ guide wavelength from the output portion 21a of the magnetron 21.

For this reason, the phase of the microwave going to an opposite direction, that is, from the lower part to the upper part in FIG. 1 and being reflected in the microwave guide mounting portion 22 namely changing the microwave traveling direction into a forward direction (that is, the direction from the upper part to lower part), coincides with that of the microwave which goes to a forward direction directly from the output portion 21a, and the resultant output can be taken out.

The isolator portion 23 is an element for allowing the microwave traveling in a specific direction to pass through and for absorbing and preventing the microwave from traveling to the direction opposite to the specific direction. Concretely, the isolator portion 23 allows the microwave traveling in a forward direction from a magnetron 21 to the applicator portion 1 to pass through. On the other hand, the isolator portion 23 does not allow the microwave traveling in the opposite direction from the applicator portion 1 to the magnetron 21 to pass through.

Therefore, the system prevents the magnetron 21 from being damaged due to the microwave traveling in the opposite direction. A power monitoring portion 24 measures the progressive electric power and reflective electric power of the microwave, and observes conditions such as a standing wave ratio and transmission electric power. A tuner portion 25 and tapered microwave guide portion 26 match a characteristic impedance of the first microwave generating portion 2 to a characteristic impedance of the applicator portion 1.

Since the isolator portion 23, the power monitoring portion 24, and the tuner portion 25 are standard microwave elements, these are illustrated as a mere microwave guide system for convenience explanation. The isolator portion 23, the power monitoring portion 24 and the tuner portion 25, which constitute the first microwave generating portion 2 for the first microwave irradiation system, are constructed by a standard microwave guide system for 2 GHz belts corresponding to a 2480 MHz belt, for example, depending on WR430 standard.

However, the cross-sectional size of the rectangular tube portion 11 forming the applicator portion 1, namely the cross-sectional size perpendicular to the wave guide axis, differs from that of a standard microwave guide system for 2 GHz belts in length and width.

Then, the tapered microwave guide portion 26 is interposed between them (the connecting portion 16 of the rectangular tube portion 11 and the tuner portion 25) having different cross-sectional sizes. A cross-sectional size of the tapered microwave guide portion 26 changes smoothly in the wave guide axis direction to match with that of the rectangular tube portion 11 and the tuner portion 25, and to propagate the microwave power oscillated in the first microwave generating portion 2 smoothly to the applicator portion 1.

The second microwave generating portion 3 for the second microwave irradiation system, except for the portion being connected to the applicator portion 1, is basically the same structure as the first microwave generating portion 2.

Namely the second microwave generating portion 3 has, for example, a magnetron 31 oscillating the microwave of a 2450 MHz belt, a microwave guide mounting portion 32 for supporting a magnetron 31 and taking out effectively the microwave output from an output portion 31a of the magnetron 31, an isolator portion 33 preventing the microwave incident from the direction of the applicator portion 1 to protect the magnetron 31, a power monitoring portion 34 for measuring the progressive electric power and reflective electric power of the microwave, and conditions such as a standing wave ratio and transmission electric power, and a tuner portion 35 and the tapered microwave guide portion 36 for matching a characteristic impedance of the second microwave generating portion 3 to a characteristic impedance of the applicator portion 1, and a flat microwave guide 37.

Since the isolator portion 33, the power monitoring portion 34, and the tuner portion 35 are also standard microwave elements, these are illustrated as a mere microwave guide system for simplification. The isolator portion 33, the power monitoring portion 34 and the tuner portion 35, which constitute the second microwave generating portion 3, are constructed by a standard microwave guide system for 2 GHz belts corresponding to the 2450 MHz belt, for example, depending on WR430 standard.

However, the cross-sectional size of the rectangular tube portion 11 forming the applicator portion 1, namely the cross-sectional size perpendicular to the wave guide axis, differs from that of the standard microwave guide system for 2 GHz belts in length and width.

Then, the tapered microwave guide portion 36 and the flat microwave guide 37 are interposed between them (the rectangular tube portion 11 and the tuner portion 35) having different cross-sectional sizes. A cross-sectional size of the tapered microwave guide portion 36 and the flat micro wave guide 37 change smoothly in the wave guide axis direction to match with that of the rectangular tube portion 11 and the tuner portion 25, and to propagate the microwave power oscillated in the first microwave generating portion 2 smoothly to the applicator portion 1.

The first microwave generating portion 2 is connected to the applicator portion 1 so that the wave guide axis of the first microwave generating portion 2 coincide mostly with the wave guide axis of the applicator portion 1. On the other hand, the second microwave generating portion 3 connects to the applicator portion 1 so that the wave guide axis of the second microwave generating portion 3 is perpendicular to that of the applicator portion 1. The second microwave generating portion is positioned on the upper side of the applicator portion 1 as shown in FIG. 1.

Figure 2:
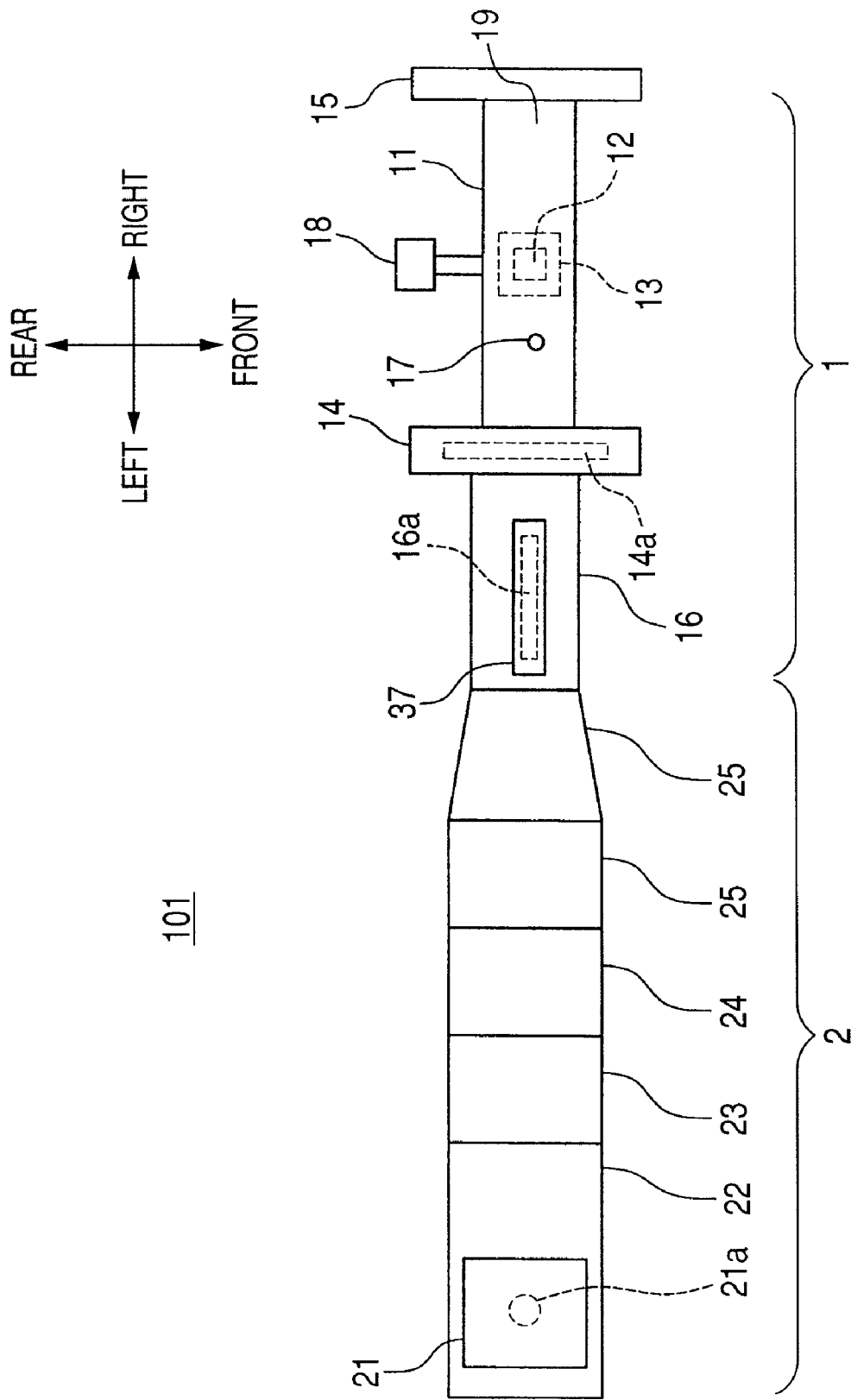
FIG. 2 is the microwave irradiation apparatus of the first embodiment in accordance with the present invention, and a plan view showing the state where a second microwave generating portion is removed.

FIG. 2 is the microwave irradiation apparatus 101 of the first embodiment, and is a plan view showing the state where the second microwave generating portion 3 is removed. An observation window portion 18 is for observing visually the object to be irradiated 12 placed in the applicator portion 1 or measuring a temperature and observing its state. The observation window portion 18 is explained in detail with reference to FIG. 12 later.

A flat opening 16a is provided at the upper side of the connecting portion 16 of the applicator portion 1. The flat opening 16a has a narrow shape along the microwave traveling direction from the first microwave generating portion 2 to the applicator portion 1, namely the horizontal direction as shown in FIG. 2 in order to transfer the microwave whose electric field and magnetic field intersects perpendicularly with the traveling wave from the first microwave generating portion 2 to the applicator portion 1.

A flat microwave guide 37 of the second microwave generating portion 3 is attached to the flat opening 16a and the microwave from the second microwave generating portion 3 propagates inside the applicator portion 1 through the flat opening 16a.

Figure 3:
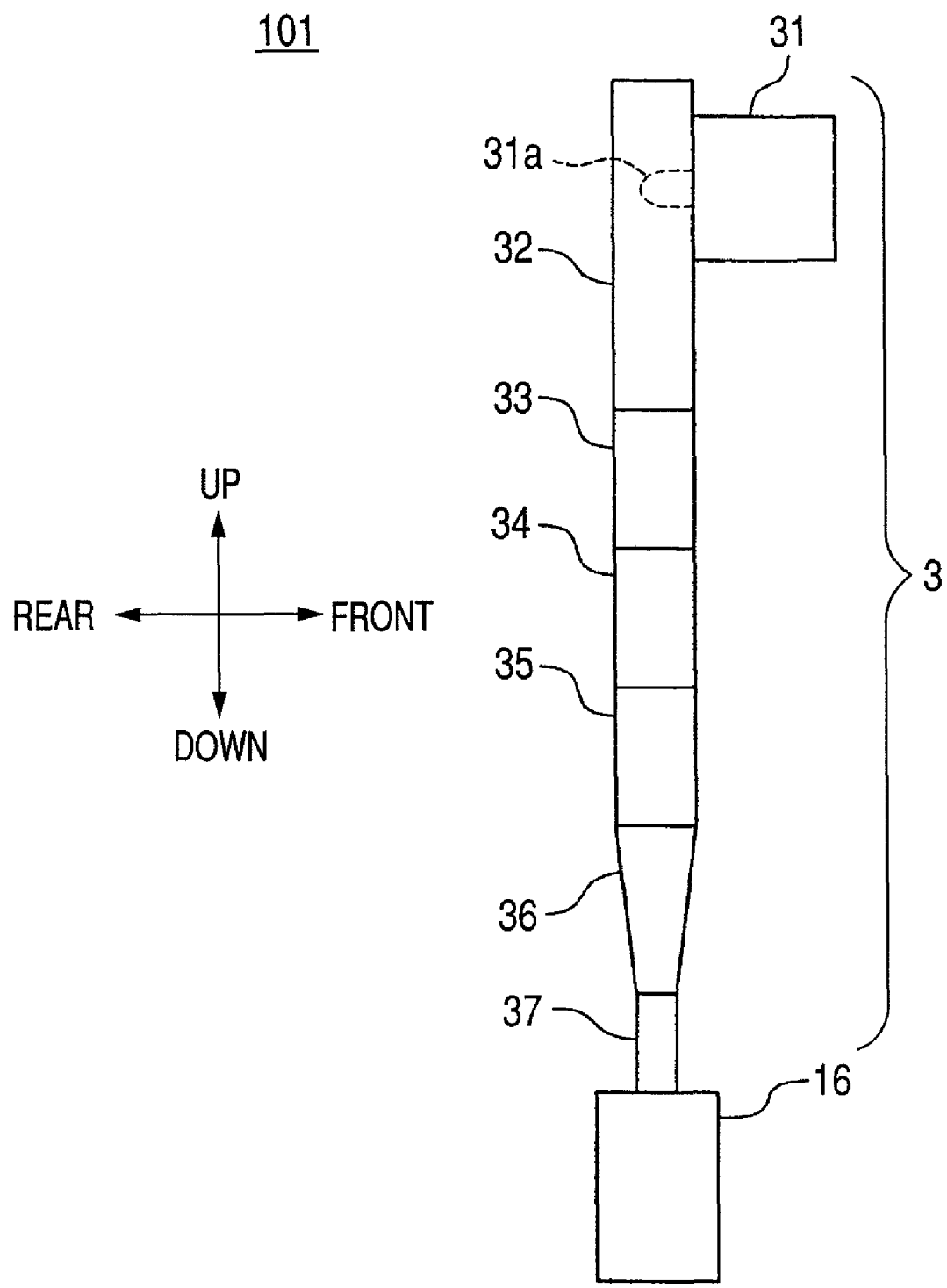
FIG. 3 is a left side view of a principal part showing a connection state between the second microwave generating portion and a connecting portion of the applicator portion.

FIG. 3 is a partial left side view showing a connection state between the second microwave generating portion 3 and the connecting portion 16 of the applicator portion 1. As shown in FIG. 3, various components of the second microwave generating portion 3 are connected to each other along nearly straight line from the microwave guide mounting portion 32 of the second microwave generating portion 3 to the flat microwave guide 37. Especially, components from the microwave guide mounting portion 32 to the tuner portion 35 are connected smoothly along the wave guide axis direction with the same shape and size.

The front face and rear face of the flat microwave guide 37 have slants so that the cross-sectional size of the flat microwave guide tapers down to a narrow flat in order to connect to the flat opening 16a (refer to FIG. 2). That is, the flat microwave guide has the cross-sectional size being narrower in comparison with that of components from the microwave guide mounting portion 32 to the tuner portion 35.

Then, for connecting the tuner portion 35 and flat microwave guide 37 to each other smoothly and matching a characteristic impedance of the second microwave generating portion 3 to a characteristic impedance of the applicator portion 1 gradually on the way of microwave traveling path, the shape and size of an upper end of the tapered microwave guide portion 36 are the same as that of the lower end of the tuner portion 35, and the shape and size of a lower end of the tapered microwave guide portion 36 are the same as that of the upper end of the flat microwave guide 37.

Figure 4:
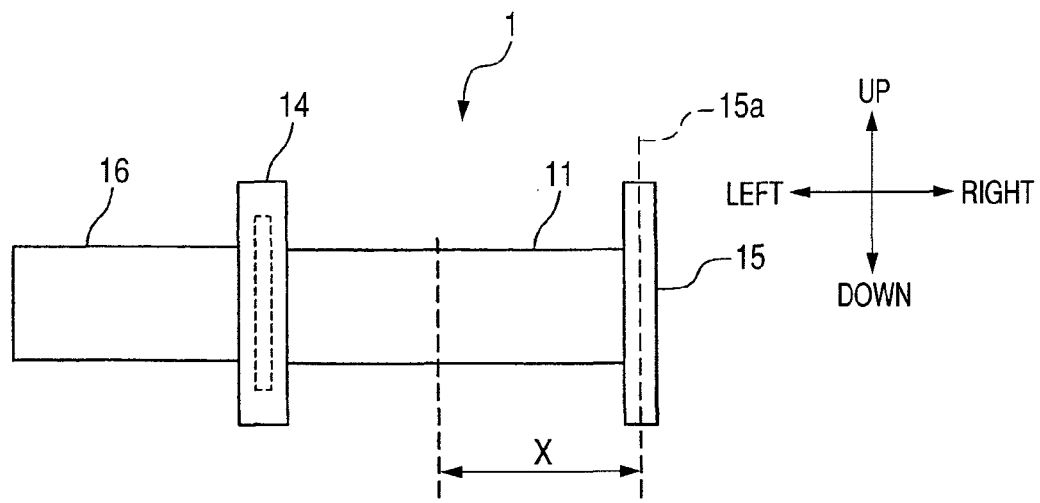
FIG. 4 is an elevation view showing the applicator portion.

Next, referring to FIG. 4 through FIG. 6, we explain what kind of electromagnetic field is generated within the applicator portion 1 or the like in the microwave irradiation apparatus 101. FIG. 4 is an elevation view showing the applicator portion 1.

Here, the description of the first microwave generating portion 2 and the second microwave generating portion 3 (refer to FIG. 1) are omitted for simplifying the explanation. A short circuit surface 15a shows a position of the short circuit face in the microwave short circuit portion 15 disposed at one end of the applicator portion 1. Moreover, a distance X is a length on the basis of short circuit face 15a and defines the position from the short circuit face 15a in the applicator portion 1.

Figure 5A:
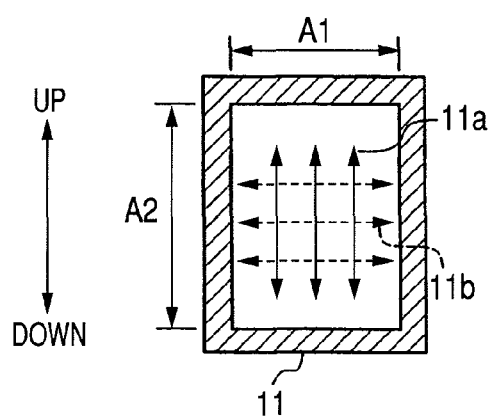
FIGS. 5A and 5B are vertical cross sectional views of the rectangular tube portion of the applicator portion.
Figure 5B:
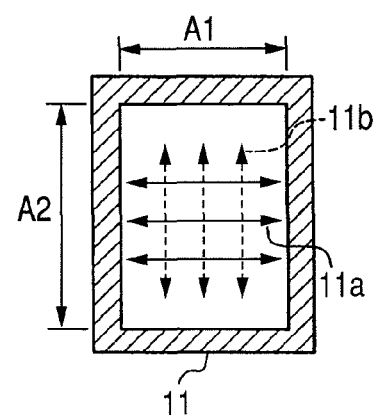

FIGS. 5A and 5B are vertical cross sectional views in the rectangular tube portion 11 of the applicator portion 1. As shown in FIG. 5A, the direction of the electric field of the microwave irradiated by the first microwave generating portion 2 turns to the vertical direction as an arrow 11a of a solid line, and direction of the magnetic field turns to horizontal direction as shown by an arrow 11b of a broken line.

On the other hand, as shown in FIG. 5B, the electric field direction of the microwave irradiated by the second microwave generating portion 3 turns to the horizontal direction as shown by an arrow 11a of a solid line, and the magnetic field direction thereof turns to the vertical direction as shown by an arrow 11b of a broken line because the microwave is irradiated through a flat opening 16a provided at the upper surface of the connecting portion 16.

Thus, the direction of the electric field (or magnetic field direction) in the microwave from the first microwave generating portion 2 and the direction of the electric field (or magnetic field) in the microwave from the second microwave generating portion 3 cross each other at right angles.

FIGS. 6A and 6B are graphs showing a relationship between the distance X (refer to FIG. 4) from the short circuit face 15a and the square value of the electromagnetic field intensity produced by the microwave inside the applicator portion 1. Incidentally, the square value of the electromagnetic field intensity is normalized and illustrated.

As shown in FIG. 6B, with respect to the distance X up to the observation point on the basis of the short circuit face 15a, the square value (relative value) $(E_1)^2$ of the electric field (field intensity) generated by the first microwave generating portion 2 in the applicator portion 1 becomes substantially 0, namely shows a wavy form of $(E_1)^2=0$ at the distance X=0 due to the electrical short-circuiting of the short circuit face 15a.

On the other hand, the square value (relative value) $(H_1)^2$ of the magnetic field (magnetic flux density) shows the shape of a complementary wavy form indicating the maximum value of $(H_1)^2$ at the distance X=0.

As shown in FIG. 6A, with respect to the distance X up to the observation point on the basis of short circuit face 15a, the square value (relative value) $(E_1)^2$ of the electric field (field intensity) generated by the second microwave generating portion 3 in the applicator portion 1, also becomes substantially 0, namely shows a wavy form of $(E_1)^2=0$ at the distance X=0 because the short circuit face 15a is short-circuited electrically. On the other hand, the square value (relative value) $(H_1)^2$ of the magnetic field (magnetic flux density) presents a complementary wavy form in which $(H_1)^2$ shows the maximum value substantially at the distance X=0.

The section crossing the wave guide axis of the rectangular tube portion 11 of the applicator portion 1 is rectangular, and its size of the vertical side differs from that of the horizontal side. The inner width A1 in the horizontal direction is set up smaller than the inner length A2 of the vertical direction. For example, the inner width A1=69.3 mm, and the inner length A2=86.0 mm.

Therefore, the guide wavelength $\lambda_1$ in the applicator portion 1 in the propagation mode, which has the electric field $E_1$ of the vertical direction in the microwave generated by the first microwave generating portion 2, becomes a large value as compared with the guide wavelength $\lambda_2$ in the applicator portion 1 in the propagation mode, which has the electric field $E_2$ of the horizontal direction in the microwave generated by the second microwave generating portion 3.

Generally, the relationship between the microwave guide inner size A and the guide wavelength $\lambda$ is expressed with the following formula from wavelength $\lambda 0$ of the microwave in free space.

$$\lambda = \frac{\lambda 0}{\sqrt{1 - \left[\frac{\lambda 0}{2A}\right]^2}}$$

The microwave short circuit portion 15 is provided at the end of the applicator portion 1 to keep a short circuit state electrically, and the microwave propagating through inside of the applicator portion 1 is almost perfectly reflected by the short circuit face 15a. For this reason, at the position of the short circuit face 15a, that is, the distance X=0, both of the electric field $E_1$ and electric field $E_2$ reduce to zero.

Moreover, as shown in FIGS. 6A and 6B, the progressive wave of the microwave and the reflective wave from the short circuit face 15a interfere with each other at the position of X>0 and thereby a standing wave is formed. Accordingly, provided that an observation position is changed to enlarge the distance X, the square values (relative value) $(E_1)^2$ and $(E_2)^2$ of the electric field (field intensity) will change large at a half cycle of the guide wavelength $\lambda$.

Additionally, relating to distribution of the electric field and magnetic field in the central part of the microwave guide section, because the magnetic field becomes small in the part where the electric field is large and the magnetic field becomes large in the part where the electric field is small, the distribution of $(H_1)^2$ and $(H_2)^2$ changes as a broken line shown in FIG. 6.

And the propagation modes of $E_1$ and $E_2$ have different guide wavelengths from each other. Accordingly a gap of distribution between $(E_1)^2$ and $(E_2)^2$ becomes large according to increasing of the distance X and in the position, namely, the distance X=Xo, $(E_2)^2$ shows the maximum and on the contrary $(E_1)^2$ becomes almost zero. In relation to the magnetic field distribution at this position, the $(H_2)^2$ will be zero and the $((H_1)^2$ shows the maximum.

Namely, at the position of the distance X=Xo, the electric field $E_2$ generated by the second microwave generating portion 3 and the magnetic field $H_1$ generated by the first microwave generating portion 2 will exist simultaneously. Therefore, when putting the object 12 to be irradiated at this position, it will become possible to control independently the electric field $E_2$ and magnetic field $H_1$ irradiating the microwave to the object 12 simultaneously.

Figure 7:
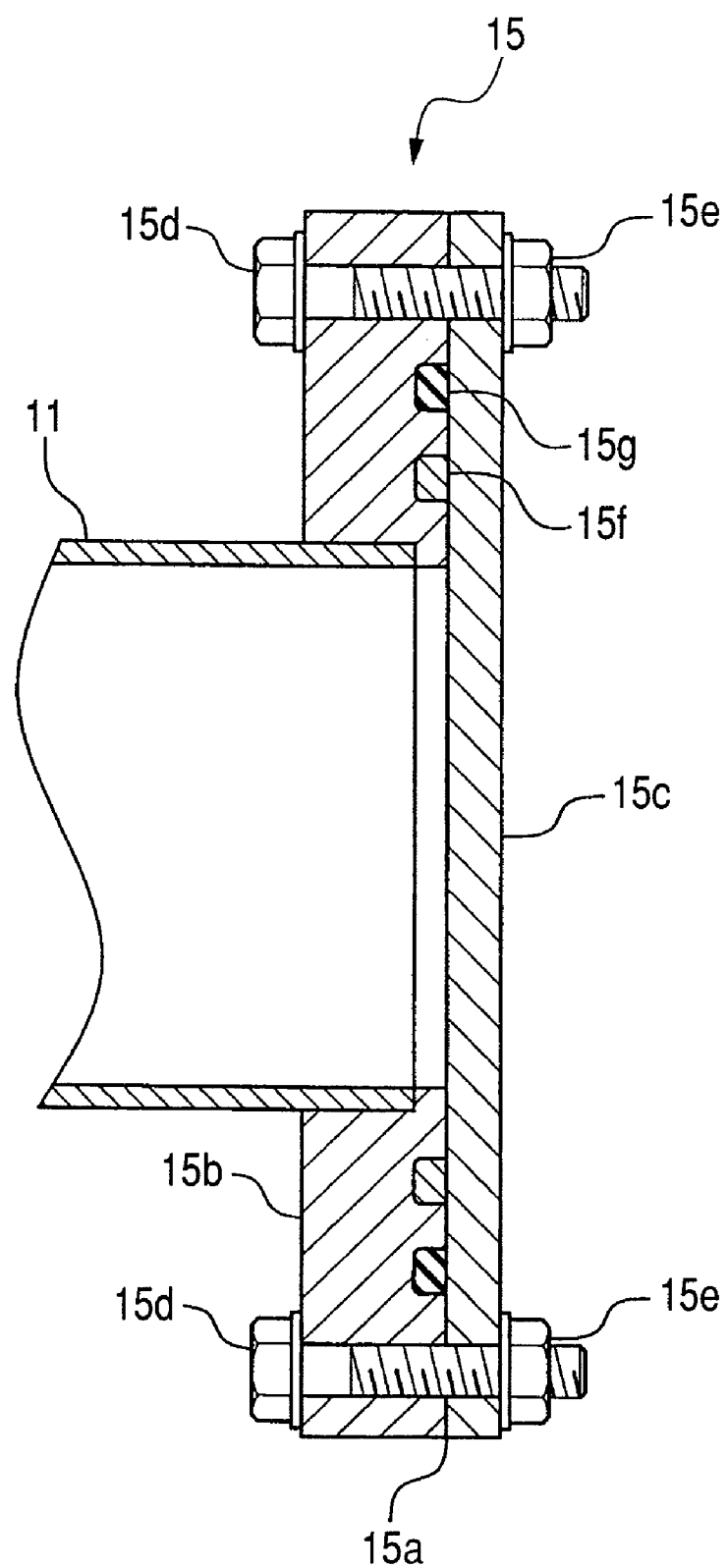
FIG. 7 is a vertical cross sectional view of the microwave short circuit portion showing a first example in detail.

FIG. 7 is a vertical cross sectional view of the microwave short circuit portion 15 showing a first example in detail.

In this microwave short circuit portion 15, a flange portion 15b made of metal is fixed at one end of the rectangular tube portion 11 of the applicator portion 1 by soldering or brazing. A short circuit plate 15c is further joined to the flange portion 15b to form a short circuit face 15a and is bound tightly by plural bolt 15d and nuts 15e.

Furthermore, an annular conductive gasket 15f made of metal mesh is arranged in a groove prepared in the flange portion 15b, and a sealing gasket 15g is sandwiched between the flange portion 15b and the short circuit plate 15c at the circumference to keep air tightness.

The sealing Gasket 15g is composed of plastics such as silicone rubber, fluoro-resin, or the like suitable to maintain the property of air-tightness, for example, elasticity, pliability or the like.

In this microwave short circuit portion 15, the electric microwave leaking out from the minute gap between the short circuit face 15a which is the contact portion of the flange portion 15b and the short circuit plate 15c is decreased by the conductive gasket 15f composed of a metal mesh. Thus, electric wave is cut off by the conductive gasket 15f to prevent the sealing gasket 15g from being heated by the microwave.

Figure 8:
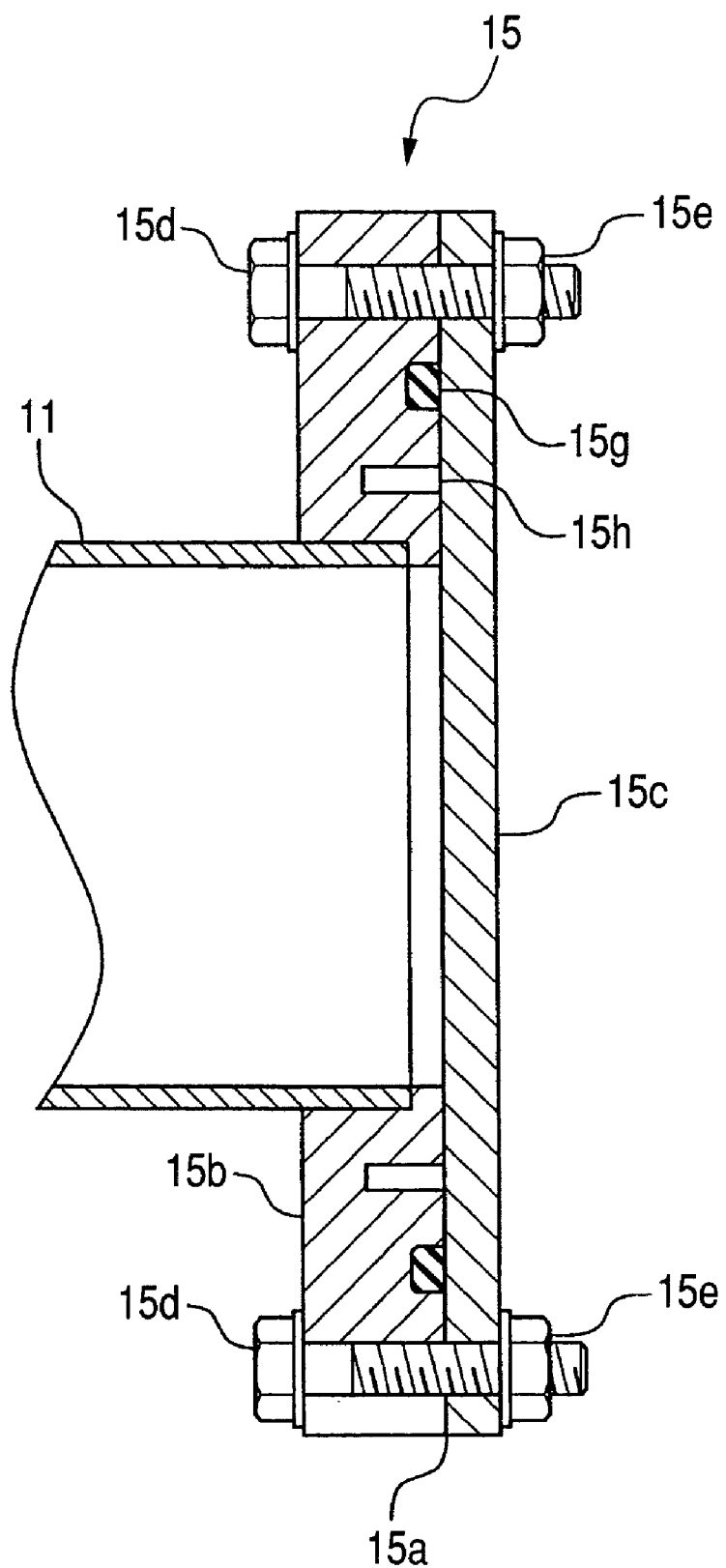
FIG. 8 is a vertical cross sectional view of the microwave short circuit portion showing a second example in detail.

FIG. 8 is a vertical cross sectional view of the microwave short circuit portion 15 showing the second example in detail. The second example of this microwave short circuit portion 15 prepares a ¼-wave length choke 15h instead of the conductive gasket 15f in the first example (refer to FIG. 7) of the above mentioned microwave short circuit portion 15.

In the second example of this microwave short circuit portion 15, the fundamental wave of the microwave, which leaks out toward the exterior passing through along the minute gap between the flange portion 15b and the short circuit plate 15c, and is caught by the ¼-wave choke 15h, and most of all leaked microwave is cancelled by self-interference. Therefore, it prevents the sealing gasket 15g from being heated by the microwave.

Figure 9:
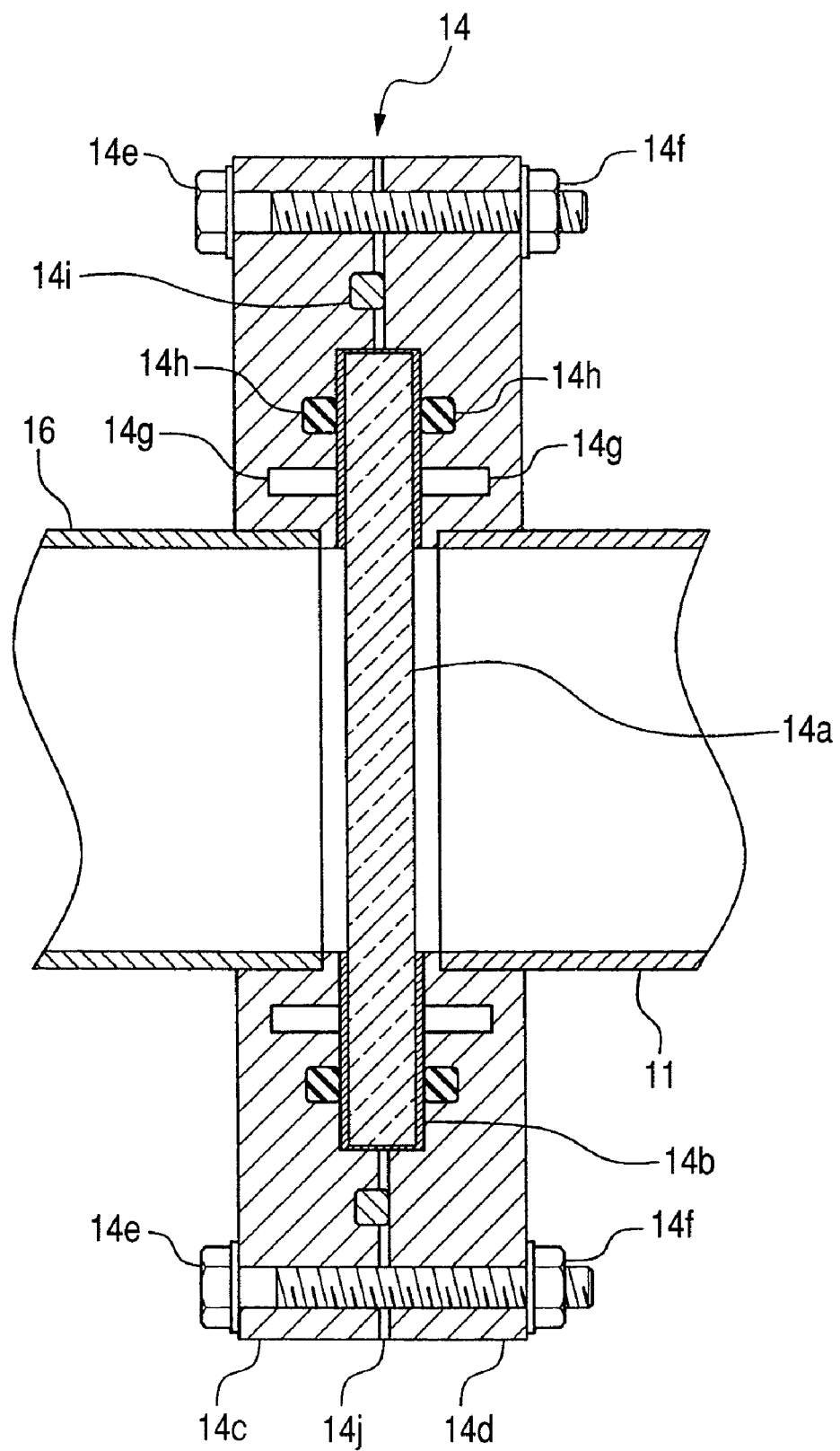
FIG. 9 is a vertical cross sectional view of a partition window portion in the microwave irradiation apparatus showing a first example in detail.

FIG. 9 is a vertical cross sectional view of the partition window portion 14 provided in the microwave irradiation apparatus 101 showing the first example in detail. In the first example of this partition window portion 14, a flange (B) 14d made of metal is fixed to the other end of the rectangular tube portion 11 of the applicator portion 1 by soldering and brazing. In addition, a flange (A) 14c made of metal is fixed to one end of the connecting portion 16 of the applicator portion 1 by soldering and brazing.

A partition window 14a is a rectangular plate having the permeability of microwave, such as alumina ceramics and quartz. An annular electric conductive film 14b is formed around a central area surface of the partition window, by performing metal plating. The central area surface allows the microwave to pass through from the connecting portion 16 to the rectangular tube portion 11. Therefore, the metal plating is provided except for the central area surface of the partition window 14a.

The partition window 14a is sandwiched between the flange (A) 14c and flange (B) 14d being fitted into annular hollows of these flanges, and bound tightly and fixed by plural bolts 14e and nuts 14f.

Moreover a ¼ wave length choke 14g is disposed on the contact surface between the electric conductive film 14b of the partition window 14a and the flange (A) 14c or the flange (B) 14d for preventing the electric wave leakage from the minute gap and a sealing gasket 14h is inserted to maintain air-tightness.

The sealing gasket 14h uses O-ring fulfilling suitable elasticity, air-tightness, or the like, such as plastics, silicone rubber and a fluoro-resin. The sealing gasket 14h is, from a viewpoint of avoiding irradiation of strong microwave, constituted so as to intercept the electric wave leakage from a contact portion by the ¼ wave length choke 14g to the fundamental wave of the microwave, and prevent it from heating with the microwave.

As described above, the partition window portion 14 has the partition window 14a sandwiched between the flange (A) 14c and flange (B) 14d and some gap 14J is provided in order to absorb tolerance of the parts.

Since the ¼-wave length choke 14g is optimized to the fundamental wave of microwave, harmonics ingredients, such as the second harmonics of microwave to the fifth harmonics, are not sufficiently intercepted, there is a possibility of leaking out from the gap 14J to outside. Then, a conductive gasket (A) 14i is arranged to this gap 14j and the harmonics ingredients of the microwave are attenuated and prevented from leaking out outside.

Figure 10:
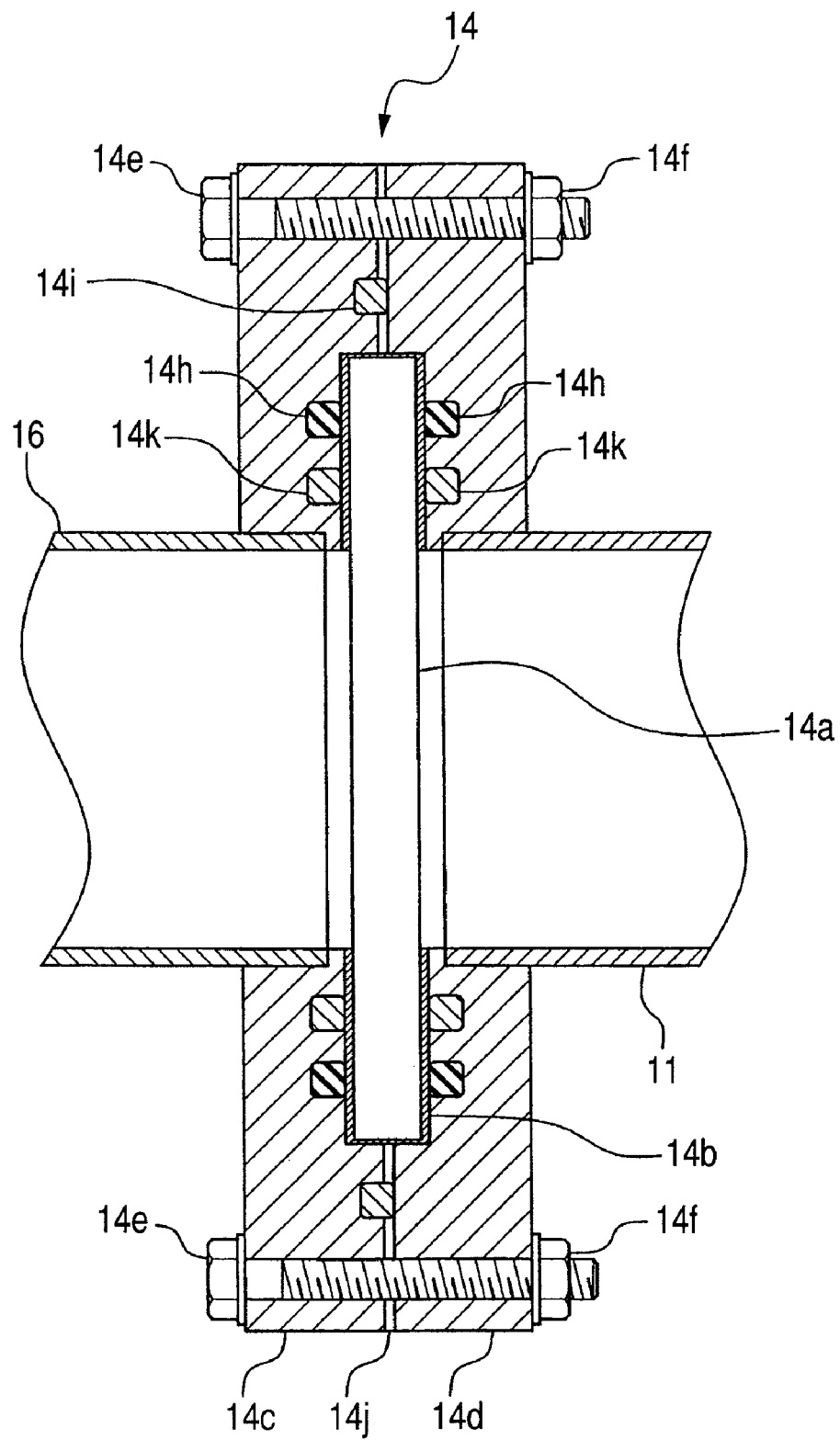
FIG. 10 is a vertical cross sectional view of the partition window portion in the microwave irradiation apparatus showing a second example in detail.

FIG. 10 is a vertical cross sectional view of the partition window portion 14 of the microwave irradiation apparatus 101 showing the second example in detail. The second example of this partition window portion 14 is provided with a conductive gasket (B) 14k instead of the ¼-wave length choke of first example (refer to FIG. 9) 14g of the partition window portion 14.

In the partition window portion 14, the conductive gasket B) 14k can short-circuit electrically not only the fundamental wave ingredient of the microwave which enters into the contact portion but also its harmonics ingredients, the leakage to the exterior of the microwave is suppressed.

That is, arrangement of the conductive (gasket A) 14i acts as a backup element that prevents unnecessary electric wave leakage. Therefore, when the conductive gasket (B) 14k functions sufficiently, it is no necessary to dispose the conductive (gasket A) 14i.

Figure 11:
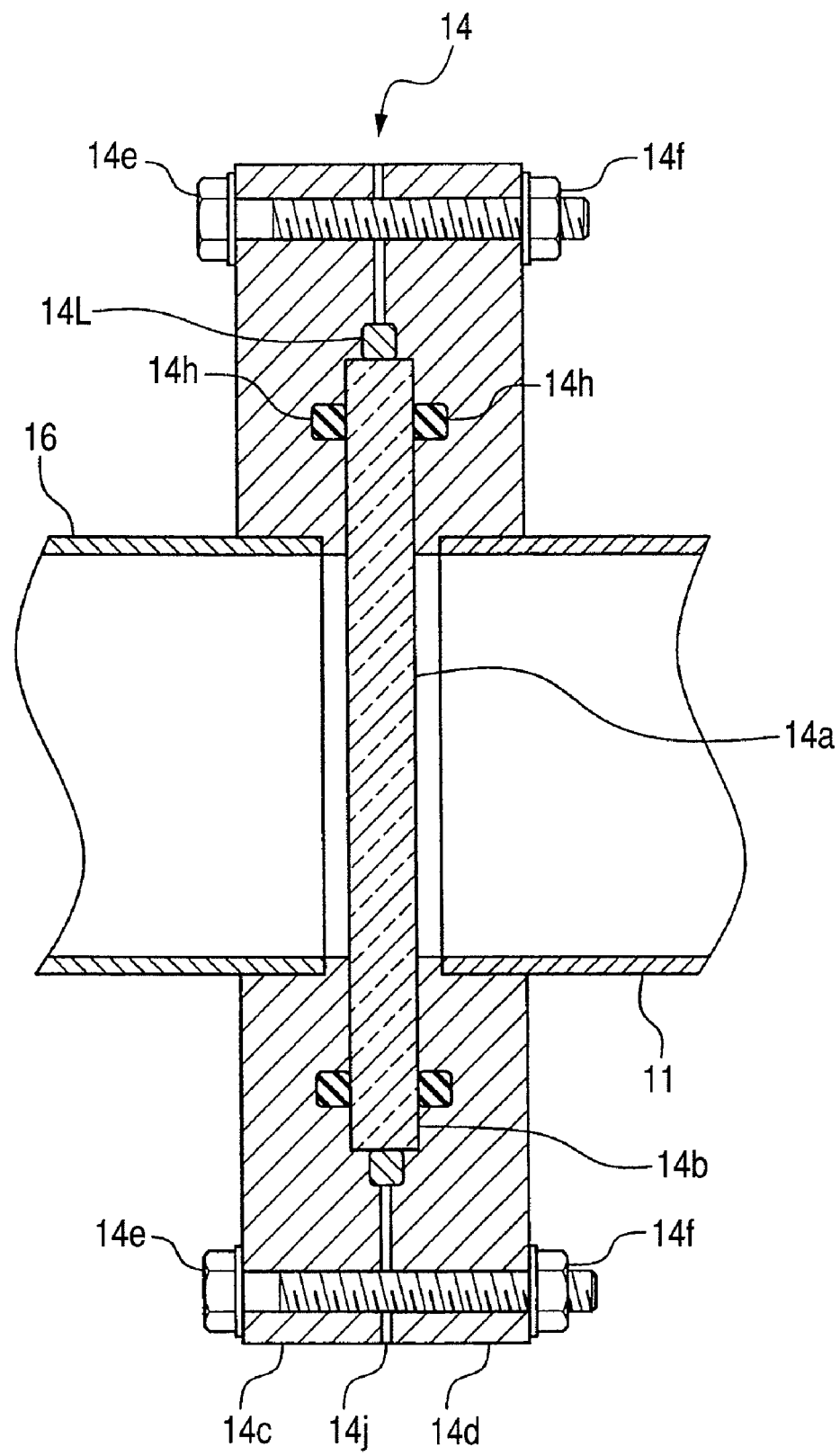
FIG. 11 is a vertical cross sectional view of the partition window portion in the microwave irradiation apparatus showing a third example in detail.

FIG. 11 is a vertical cross sectional view of the partition window portion 14 of the microwave irradiation apparatus 101 showing the third example in detail.

In the third example of the partition window portion 14, the partition window 14a is made of the rectangular plate of mere alumina ceramics to omit a surface of the electric conductive film 14b (refer to FIG. 9). A conductive gasket (C) 14L is made of metal mesh, and provided around the outer peripheral of the partition window 14a being sandwiched between both of the flanges 14c and 14d to prevent the microwave leaked through a gap 14J.

Moreover, each of sealing gaskets 14h is sandwiched between one side of the partition window 14a and the flange 4c, and between the other side of the partition window 14a and the flange 14d. Each sealing gasket 14h is located close to the conductive gasket (C) 14L in which the microwave is short-circuited electrically, thereby it is possible to prevent the sealing gasket 14h from being overheated due to the electric field of the microwave.

In addition, in the first example (refer to FIG. 9) of the partition window portion 14 and the second example (refer to FIG. 10), since the electric conductive film 14b of the partition window 14a is provided, as compared with the third example (refer to FIG. 11) of the partition window portion 14, even if the sealing gasket 14h is arranged in the weak place of the electric field, the partition window portion 14 (refer to FIG. 9 and FIG. 10) with the electric conductive film 14b is more difficult to be heated by the microwave, and may be applied to higher output power equipments.

Figure 12:
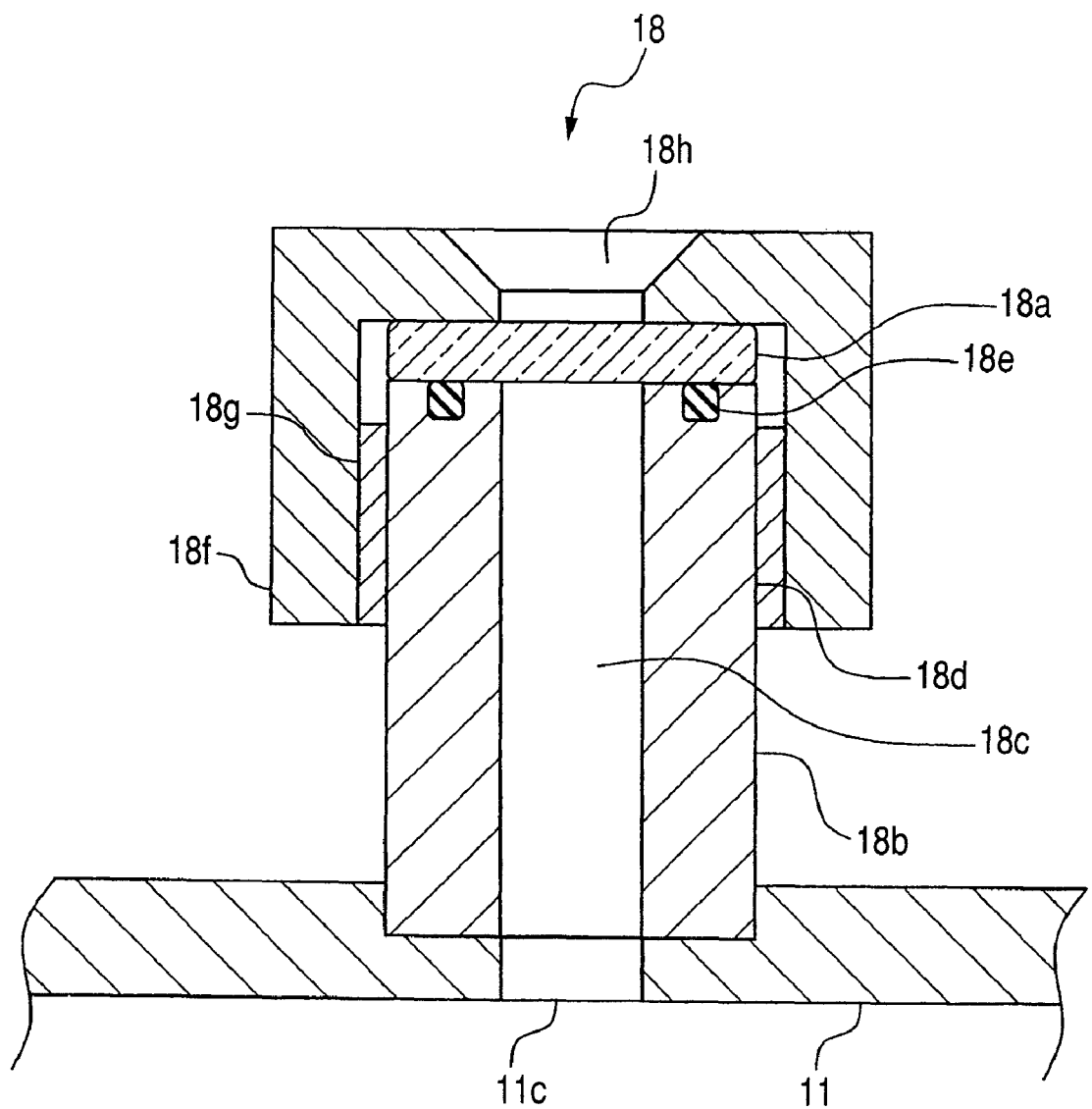
FIG. 12 is a vertical cross sectional view showing a observation window portion in detail.

FIG. 12 is a vertical cross sectional view showing a part of the observation window portion 18 in detail. In the observation window portion 18, one end of a metal cylinder 18b having a center through hole 18c is bonded to the side of the rectangular tube portion 11 of the applicator portion 1 by soldering or brazing.

A silica glass disk 18a is disposed at the other end of the metal cylinder 18b, and a screw 18g of an attachment 18f and a screw 18d of the metal cylinder 18b are joined to each other. A sealing gasket 18e is provided at the end surface of the metallic cylinder 18b where the metallic cylinder 18b puts into contact with the silica glass disk 18a.

Since an inner diameter of the center through hole 18c of the metal cylinder 18b is made sufficiently smaller than the interception wavelength of the microwave, the leakage of the microwave is intercepted here.

The inside of the rectangular tube portion 11 can be observable through a center hole 18h of the attachment 18f used for the observation, the silica glass disk 18a, the center hole 18c of the metal cylindrical portion 18b and a hole 11c provided in the rectangular tube portion 11.

As mentioned in the above explanation, the present embodiment in accordance with the invention enables to irradiate the microwave to the object 12 (or space portion where the object 12 is placed to be irradiated) while controlling the magnetic field and the electric field of the irradiated microwave independently.

In addition, although the first microwave generating portion 2 and the second microwave generating portion 3 generate the microwave of a 2450 MHz belt, they may use also other frequency band, for example, a 5800 MHz belt, 915 MHz, or the like.

In this case, if suitably modifying sizes corresponding to the rectangular tube portion 11 of the applicator portion 1, the connecting portion 16, the microwave short circuit portion 15, the partition window portion 14, the connecting portion 16, and other related microwave elements, the same action as well as advantages will be assured.

Incidentally, as the length of distance Xo (refer to FIGS. 6A and 6B) may become misaligned depending on the size and the property of the object 12 and the material of a base 13 which composes of an insulator for holding the object, it is desirable to perform a microwave electromagnetic field simulation and microwave electromagnetic field measurement beforehand, so as to place the object to be irradiated 12 and a base 13 at the optimal position.

It may be preferable to change the position of the short circuit face 15a (refer to FIG. 4) by inserting a metal spacer (not shown) into the microwave short circuit portion 15 or to adopt a well-known variable short circuit plate.

Although this embodiment enables to irradiate the microwave to the object 12 while controlling simultaneously and independently the electric field $E_2$ and magnetic field $H_1$ in the position of distance $X=Xo$, it can also irradiate the microwave to the object 12 while controlling the electric field $E_1$ and magnetic field $H_2$ simultaneously and independently in place of controlling the electric field $E_2$ and magnetic field $H_1$ by changing an inner size of the rectangular tube portion 11 of the applicator portion 1 or choosing again the place where the distance=Xo.

Though the sealing gasket 15g of the microwave short circuit portion 15 (refer to FIG. 7 and FIG. 8) uses the O-ring made of plastic, instead, other structures may be applicable to satisfy both of airtight and conductivity using the gasket (not shown) made of a soft metal like copper. In this case, the conductive gasket 15f and ¼-wave choke 15h are omissible. Similarly, the conductive gasket (B) 14k and ¼-wave choke 14g may be omissible using the copper gasket described above instead of the sealing gasket 14h of the partition window portion 14 (refer to FIG. 9 and FIG. 10).

In addition, the conductive gasket (A) 14i shown in FIGS. 9 and 10 is backup parts for the conductive gasket (B) 14k shown in FIG. 10 and if the conductive gasket (B) 14k and ¼ wave length choke 14g adequately function, it can be omitted. Therefore, as a result of testing for an electric wave leakage without the conductive (gasket A) 14i, when necessity of the gasket (A) 14i occurs depending on the situation, it should just be used.

While this embodiment performs insertion and extraction of the object 12 to be irradiated, at a condition where the microwave short circuit portion 15 is removed, the microwave short circuit portion 15 is also allowable to fasten by the lock mechanism using an easy handle system rather than fastening by bolts 15d and nuts 15e.

Furthermore, a detachable metallic part for putting the object and its base 13 is prepared at the bottom of the rectangular tube portion 11, and it may enable to perform insertion and extraction of the object 12 by moving up and down the detachable metallic.

The present embodiment, it although is possible to irradiate the microwave to the object 12 or space portion where the object 12 is placed while controlling the magnetic field and electric field independently and simultaneously, this embodiment further may compress or decompress the atmosphere in the applicator portion 1. However, it is not limited to this but to allow using with atmospheric pressure.

The microwave irradiation apparatus 101 of the first embodiment in accordance with the present invention has at least two microwave generating portions, that is, the first microwave generating portion 2 and second microwave generating portion 3 connecting to one applicator portion 1 for irradiating the microwave energy effectively to the object 12.

One of the two microwave generating portions generates the electric field in the object 12 being housed in applicator portion 1 (or space portion where the object 12 is placed), and the other microwave generating portion generates the magnetic field in the object 12 in the applicator portion 1 (or space portion where the object 12 is placed to be irradiated).

According to this configuration, the electric field and magnetic field are respectively supplied from the independent microwave generating portions and it makes the microwave possible to control respectively and independently the electric field and magnetic field in the object 12 to be irradiated (or space portion where the object is placed to be irradiated).

If merely irradiating the microwave energy from two microwave generating portions to one place, the two microwave electromagnetic field interfere with each other, and a desired electric field and magnetic field could not be generated. However, according to the microwave irradiation apparatus 101 of the present embodiments, a polarization plane generated in one microwave irradiation mode for the electric field irradiation and a polarization plane generated in the other microwave irradiation mode for the magnetic field irradiation is set up to cross each other at right angles so as not to interfere mutually.

Moreover, the phase of the microwave irradiation mode for the electric field irradiation can be controlled so as to be the maximum electric field and the minimum magnetic field in the object 12 (or space portion where the object 12 is placed to be irradiated), on the other hand, the phase of the microwave irradiation mode for the magnetic field irradiation is controlled so as to be the maximum magnetic field and the minimum electric field respectively.

Namely, by the control device (not shown) for controlling the microwave generating portion for the electric field irradiation, this control device is able to control independently the strength of the electric field in the object; and by the control device (not shown) for controlling the microwave generating portion for the magnetic field irradiation, this control device is able to control independently the strength of the magnetic field in the object 12.

Second Embodiment

Figure 13:
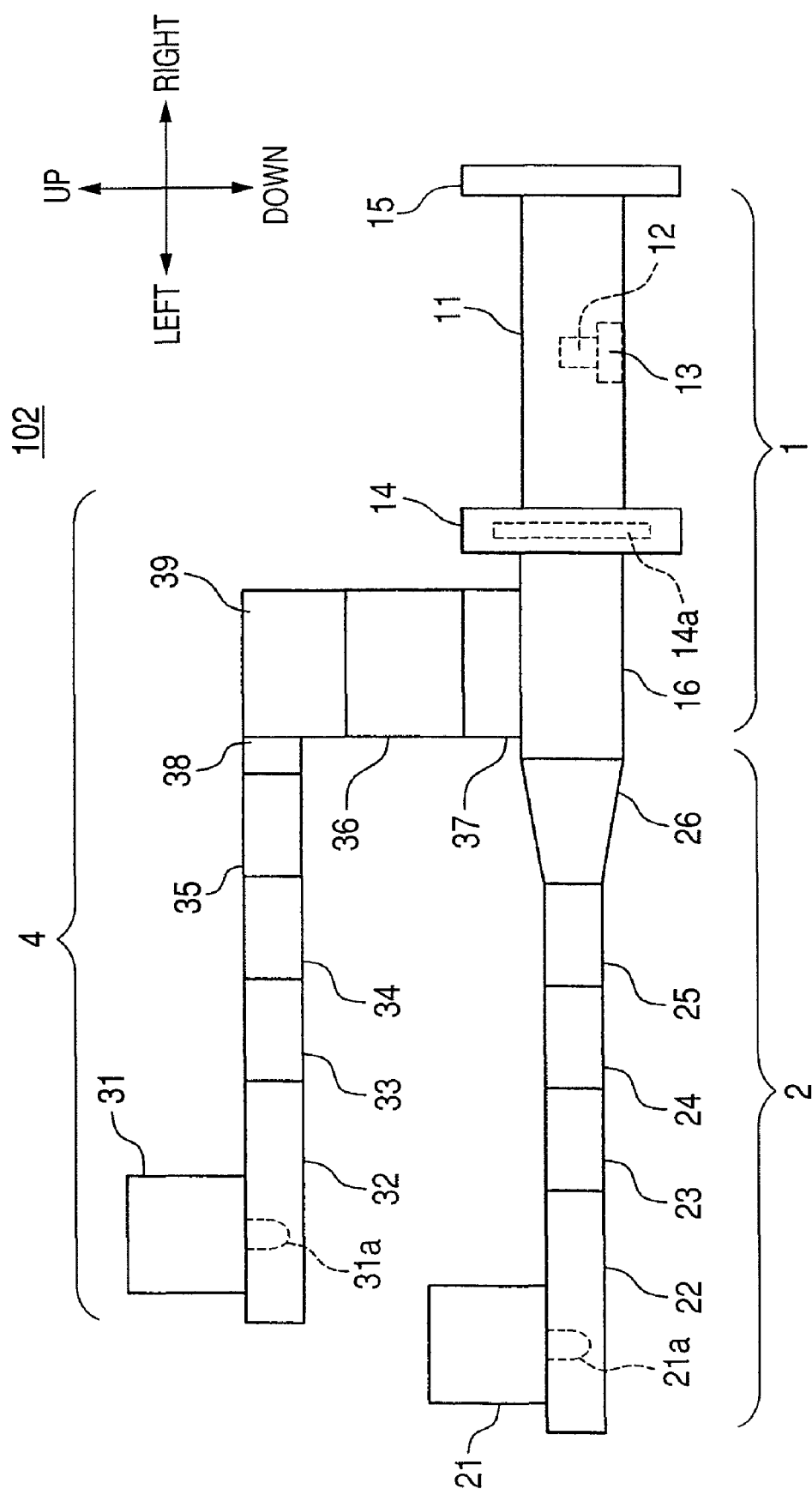
FIG. 13 is an elevation view showing a microwave irradiation apparatus of a second embodiment in accordance with the present invention.
Figure 14:
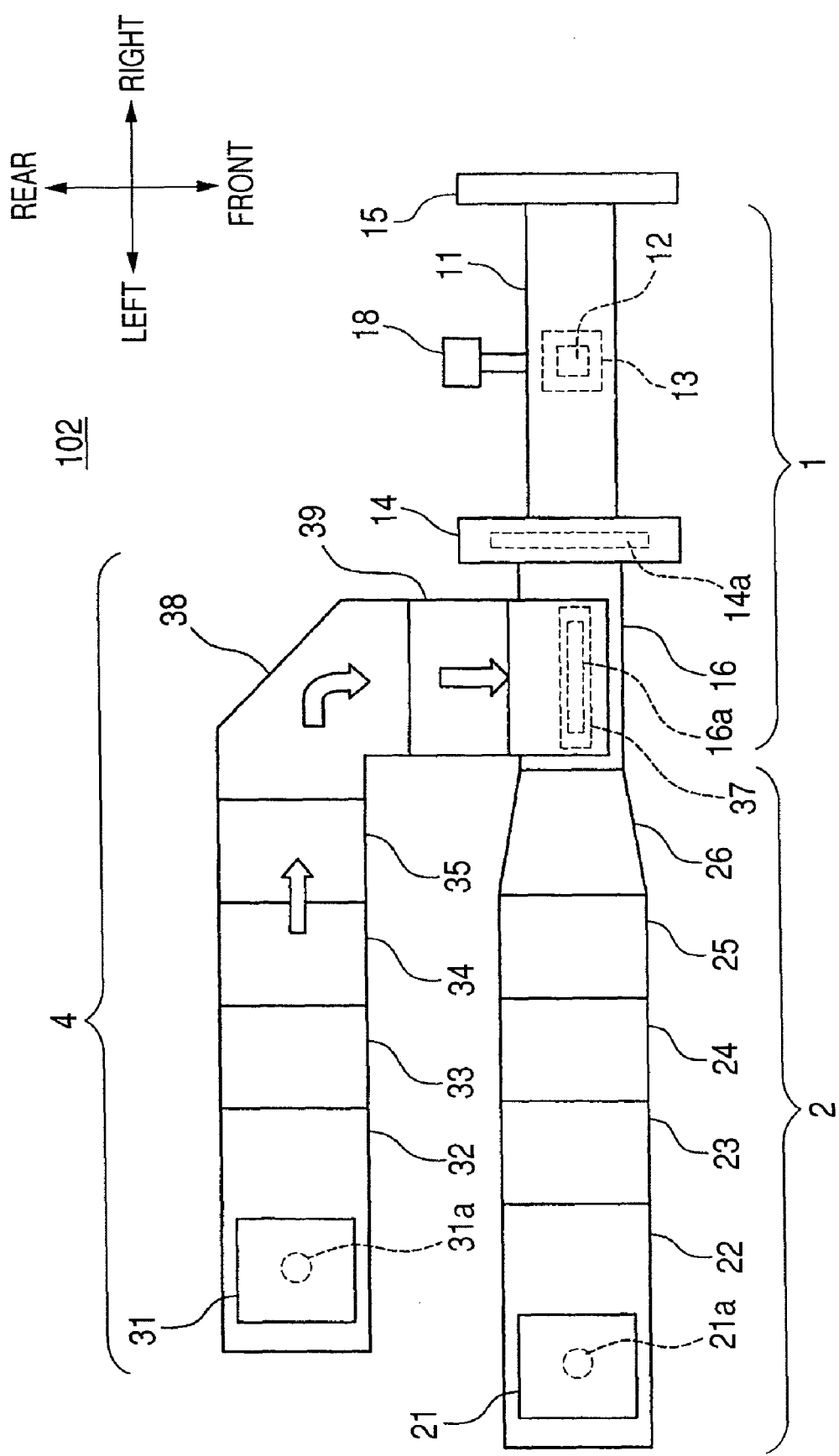
FIG. 14 is a plan view showing the microwave irradiation apparatus of the second embodiment in accordance with the present invention.

FIG. 13 is an elevation front view showing a microwave irradiation apparatus 102 of the second embodiment in accordance with the present invention, and FIG. 14 is a plan view showing the microwave irradiation apparatus 102 of the second embodiment in accordance with the invention. As shown in FIG. 13, this microwave irradiation apparatus 102 is the same structure as the microwave irradiation apparatus 101 of the first embodiment excepting the second microwave generating portion 4 which is bent horizontally in parallel to the first microwave generating portion 2 instead of the second microwave generating portion 3 (refer to FIG. 1).

As shown in FIG. 14, the second microwave generating portion 4 has a structure in which the H-surface corner 38 is inserted in the following stage of the tuner portion 35, and further the E-surface corner 39 is inserted in a next stage of the following, namely, preceding step of the tapered microwave guide portion 36 shown in FIG. 13.

In this way, as shown in FIG. 14, the microwave oscillated by the magnetron 31 is horizontally deflected by the H-surface corner 38 by 90 degrees in the propagating direction and, the propagating direction of the microwave is deflected below by the E-surface corner 39 by 90 degrees shown in FIG. 13.

Figure 15:
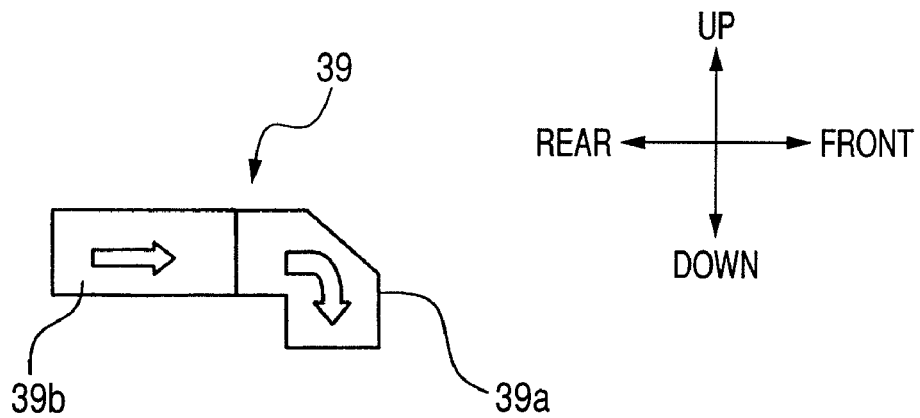
FIG. 15 is a left side view showing an E-surface corner.

FIG. 15 is a left side view showing the E-surface corner 39. The E-surface corner 39 is constituted by a short microwave guide portion 39b and a microwave guide portion 39a bent with right angles to the lower part following the short microwave guide portion 39b.

The E-surface corner 39 has functions to change the direction of microwave finally and downwardly by 90 degrees by an arrow as shown in FIG. 15 and carry out the incidence of the microwave smoothly to a flat opening 16a of the connecting portion 16 of the applicator portion 1 as shown in FIG. 14.

In the microwave irradiation system 102 of the second embodiment, the second microwave generating portion 4 is placed horizontally. A fall-down is prevented and substantial occupancy area can be decreased. The second microwave generating portion 4 can be bent into a desired form by adding further microwave guide parts, such as the H-surface corner 38, an E-surface corner 39, and a microwave guide for connecting (not shown).

For example, in the case where it is desirable to coincide the keeping position of the first and second microwave generating portion 2, 4 with the same plane, these should just be held at the same plane using further microwave guide parts, such as the H-surface corner 38, E-surface corner 39 and a connecting microwave guide (not shown).

Although the second microwave generating portion 4 changes the microwave traveling direction, first of all, it is substantially equivalent to the second microwave generating portion 3 (refer to FIG. 1) of the first embodiment and the electromagnetic operation. For this reason, according to the microwave irradiation apparatus 102 of the second embodiment, the same effects as the microwave irradiation apparatus 101 of the first embodiment may be obtained.

Furthermore, according to the microwave irradiation apparatus 102 of the second embodiment, the second microwave generating portion 4 is extended horizontally, that is, direction parallel to the wave guide axis direction of the microwave generating portion 2.

Accordingly, when comparing with the constitution which the second microwave generating portion 3 extends linearly toward the upper part, that is, perpendicular to the wave guide axis direction of the first microwave generating portion 2, like the microwave irradiation apparatus 101 of the first embodiment, mechanical stability as well as space use efficiency may be improved substantially.

Moreover, according to the microwave irradiation apparatus 102 of the second embodiment, the apparatus 102 has the second microwave generating portion 4 carrying out electromagnetic operation equal to the second microwave generating portion 3 (refer to FIG. 1) of the first embodiment, therefore, it is capable of obtaining the same effect as the microwave irradiation apparatus 101 of the first embodiment is obtained.

Third Embodiment

Figure 16:
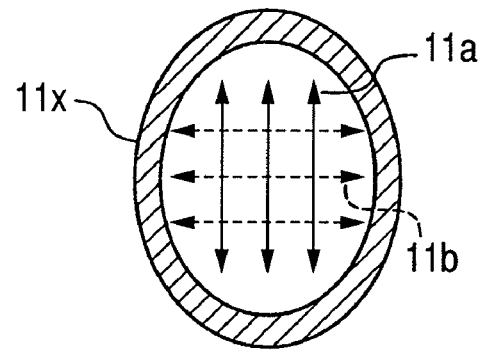
FIG. 16 is a cross sectional view showing a rectangular tube portion of a first modification used instead of the rectangular tube portion in the microwave irradiation apparatus (refer to FIG. 1) of the first embodiment in accordance with the present invention, as well as the microwave irradiation system (refer to FIG. 13) of the second embodiment (the third embodiment)

FIG. 16 is a cross sectional view showing a cylindrical tube portion 11x of the first modification used instead of the rectangular tube portion 11 in the microwave irradiation apparatus 101 (refer to FIG. 1) of the first embodiment and the microwave irradiation apparatus 102 (refer to FIG. 13) of the second embodiment in accordance with the invention. The cross sectional shape of the inside crossing the wave guide axis of the cylindrical tube portion 11x has an ellipse.

Even if it being such cross-sectional shape, the wavelength of two microwaves can differ from each other in the wave guide by controlling the microwave so that the direction of two electric fields can cross each other at right angles, and, the direction of two magnetic fields also can cross each other at right angles. Because the size of the cross section of the cylindrical tube differs in length and width. Therefore, the same effect as the first embodiment as well as the second embodiment can be obtained.

Fourth Embodiment

Figure 17:
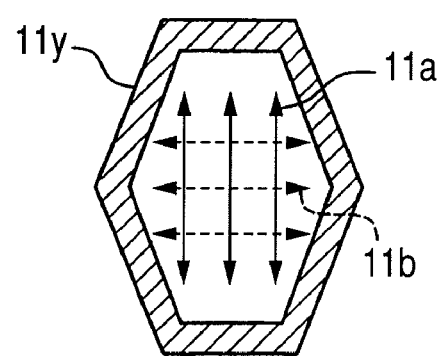
FIG. 17 is a sectional view showing a cylindrical body portion of a second modification used instead of the rectangular tube portion in the microwave irradiation system (refer to FIG. 1) of the first embodiment and the microwave irradiation system (refer to FIG. 13) of the second embodiment (the fourth embodiment).

FIG. 17 is a cross sectional view showing a hexagon tube 11y of the second modification used instead of the rectangular tube portion 11 in the microwave irradiation apparatus 101 (refer to FIG. 1) of the first embodiment and the microwave irradiation apparatus 102 (refer to FIG. 13) of the second embodiment in accordance with the present invention. While the cross-sectional shape of the inside which crosses a wave guide axis of this tube portion 11y has a shape of a hexagon, various shapes of polygon, or the like, for example, may be available.

The guide wavelength of the two microwave can differ from each other in the wave guide by controlling the microwave so that the direction of two electric fields can cross each other at right angles, and, the direction of two magnetic fields cross each other at right angles, because the size of the cross section of the tube portion differs in length and width even if it is such a cross-sectional shape. Therefore, the same effect as the first embodiment as well as the second embodiment may be obtained.

The application of the equipment in accordance with the present invention is able to obtain the microwave irradiation effects of the electric field and magnetic field in various chemical reaction systems and heat treatment systems very easily. The most effective microwave irradiation method and efficient microwave electric power application equipment may be realized with the independent control of the electric field and magnetic field.

Moreover, fixing the position of the object to be irradiated or space portion where the object is placed by the system in accordance with the present invention, the system may simultaneously perform irradiation of the magnetic field and the electric field, and irradiate independently without necessity of changing any mechanical operation of applicator. As a result, the microwave electric power application system irradiating the microwave magnetic field and electric field to the object to be irradiated in pressurization or decompression atmosphere becomes easy to be constituted.

Furthermore, the system may realize the equipment which advances the chemical reaction under the magnetic field of the microwave by irradiating the magnetic field by the microwave, and becomes possible to raise the temperature of the object to be irradiated by the microwave electric field irradiated to the object simultaneously with the microwave magnetic field as a state mixing the material with dielectric-heating property with the object to be irradiated, accommodating and covering the object in a container which is made of material with dielectric heating property.

The microwave irradiation system enables simultaneously to advance the chemical reaction based on a microwave magnetic field, performing temperature control of the object to be irradiated by the microwave electric field irradiation.

What is claimed is:

1. A microwave irradiation apparatus comprising:
an applicator portion, having an interior space for housing an object to be irradiated, wherein the interior space of the applicator portion has a rectangular section configured to cross the wave guide axis of the applicator portion, and the rectangular section has a vertical side thereof differing in size from a horizontal side thereof;
a first microwave irradiation system having a first magnetron for outputting a first microwave and a first microwave guide for guiding the first microwave;
a second microwave irradiation system having a second magnetron for outputting a second microwave and a second microwave guide for guiding the second microwave; and
a short circuit plate disposed at an end of the applicator portion, at a side opposite to a microwave input side to which the first microwave and the second microwave are inputted in a wave guide axis direction of the applicator portion;
wherein the first microwave guide is connected to the applicator portion such that a wave guide axis of the first microwave guide mostly coincides with a wave guide axis of the applicator portion, and wherein the second microwave guide is connected to the applicator portion such that a wave guide axis of the second microwave guide is perpendicular to that of the applicator portion;
wherein the second microwave guide has a flat shape, and a connection to the applicator portion via a flat opening of the applicator portion, and a narrow shape along a microwave travelling direction from the first microwave guide to the applicator portion;
wherein the first microwave irradiation system is configured in a first mode to output the first microwave to the interior space, thereby enabling generation of a maximum electric field and a minimum magnetic field at a specific location in the interior space;
wherein the second microwave irradiation system is configured in a second mode to output the second microwave to the interior space, the second microwave having a polarization plane crossing a polarization plane of the first microwave, thereby enabling generation of a maximum magnetic field and a minimum electric field at the same specific location in the interior space;
wherein the applicator portion is configured to initiate a first standing wave generated by the first microwave and a second standing wave generated by the second microwave; and
wherein a base is disposed where both an electric field of the first microwave shows a maximum value in the wave guide axis direction, and a magnetic field of the second microwave shows a maximum value in the wave guide axis direction.

2. The microwave irradiation apparatus according to claim 1,
wherein the applicator portion has an elliptical cross-sectional shape orthogonal to the wave guide axis direction; and
wherein in the interior space of said applicator portion, in the wave guide axis direction, a wave length of the first microwave is different from a wave length of the second microwave.

3. The microwave irradiation apparatus according to claim 1, wherein the applicator portion has a rectangular, elliptical, or polygonic cross-sectional shape in the wave guide axis direction.

4. The microwave irradiation apparatus according to claim 1, further comprising:
   a partition window made of a material that allows the first microwave and the second microwave to pass through;
   wherein the end of the applicator portion opposite to the short circuit is sealed at least in part by the partition window.

5. The microwave irradiation apparatus according to claim 4, wherein the partition window has an electric conductive film formed at a peripheral portion thereof.

* * * * *